United States Patent [19]

Schlemmer

[11] 4,138,854
[45] Feb. 13, 1979

[54] FREEZING APPARATUS AND METHOD

[75] Inventor: Alfred H. Schlemmer, Ninevah, Ind.

[73] Assignee: Edinburg State Bank, Edinburg, Ind.

[21] Appl. No.: 531,249

[22] Filed: Dec. 9, 1974

[51] Int. Cl.² ............................................. F25D 25/00
[52] U.S. Cl. ......................................... 62/62; 62/78;
426/524
[58] Field of Search ................ 62/63, 64, 65, 78, 266;
426/524

[56] References Cited

U.S. PATENT DOCUMENTS

| | | | |
|---|---|---|---|
| 3,298,188 | 1/1967 | Webster et al. | 62/63 |
| 3,461,680 | 8/1969 | Riche | 62/78 X |
| 3,485,055 | 12/1969 | Webster et al. | 62/63 |
| 3,507,128 | 4/1970 | Murphy et al. | 62/63 |
| 3,805,538 | 4/1974 | Fritch, Jr. et al. | 62/63 |
| 3,864,931 | 2/1975 | Guttinger | 62/63 |

Primary Examiner—Ronald C. Capossela
Attorney, Agent, or Firm—Robert A. Spray

[57] ABSTRACT

Apparatus and process for cooling unfrozen foodstuff to a desired low temperature below its freezing point, in which a supply of inert gas is used to provide a controlled atmosphere in the freezing chamber; and this controls vapor pressure, dry bulb temperature, wet bulb temperature, and the chemical composition of the atmosphere. A mechanical or refrigerant fluid system supplies the refrigerant effect for lowering the foodstuff's sensible range above freezing, latent heat of fusion, and sensible range below freezing, to the desired temperature sub-freezing sensible heat range.

2 Claims, 6 Drawing Figures

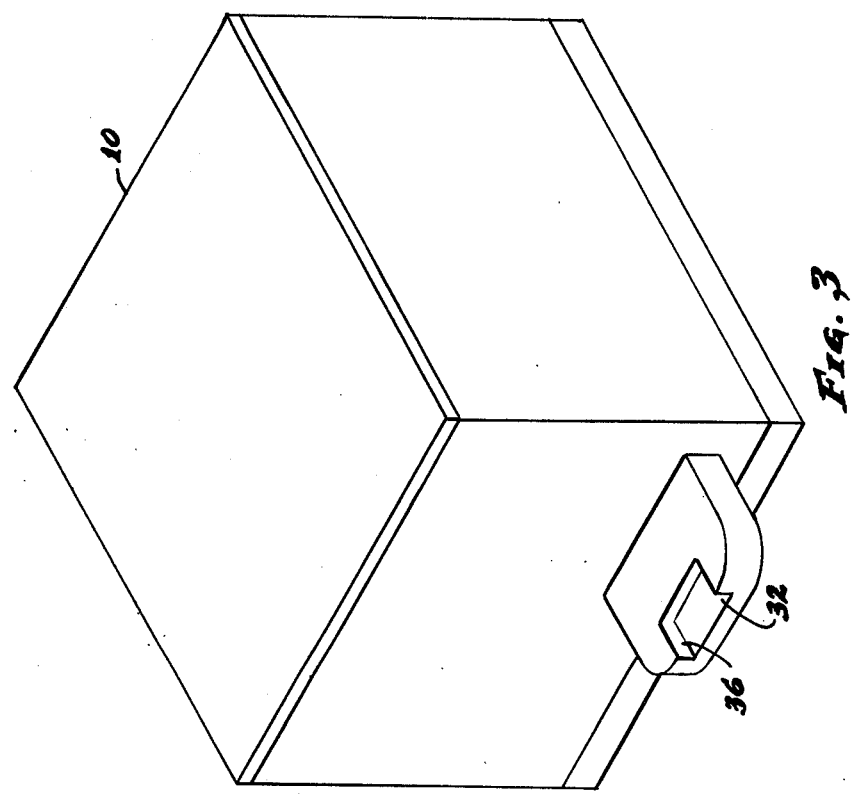
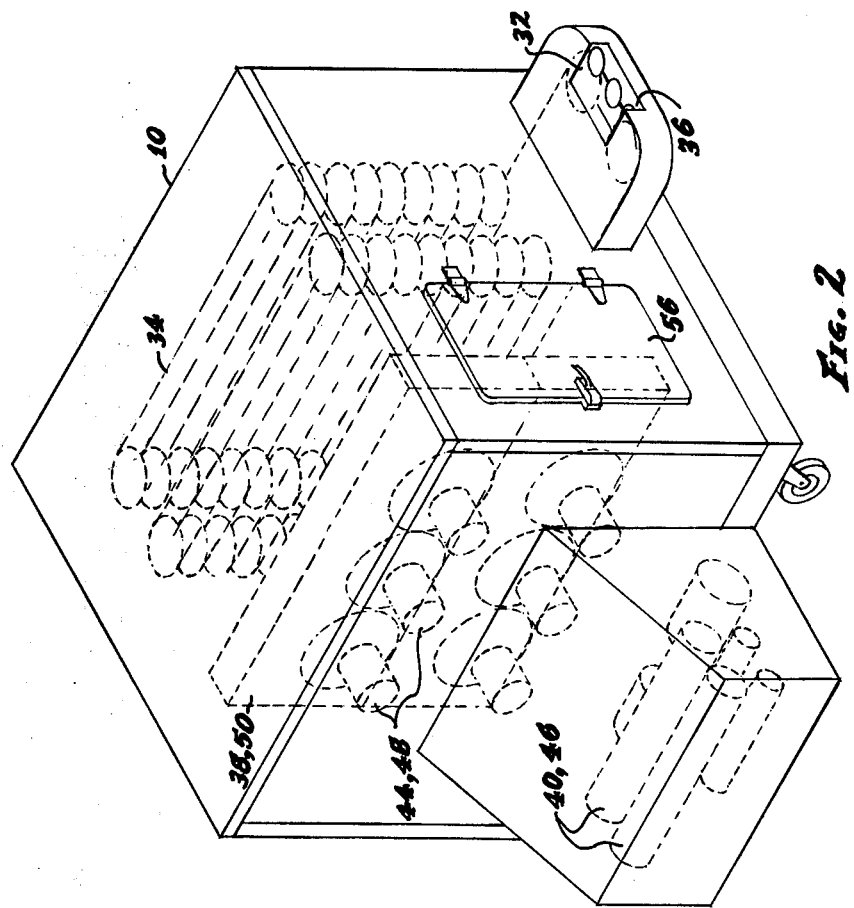

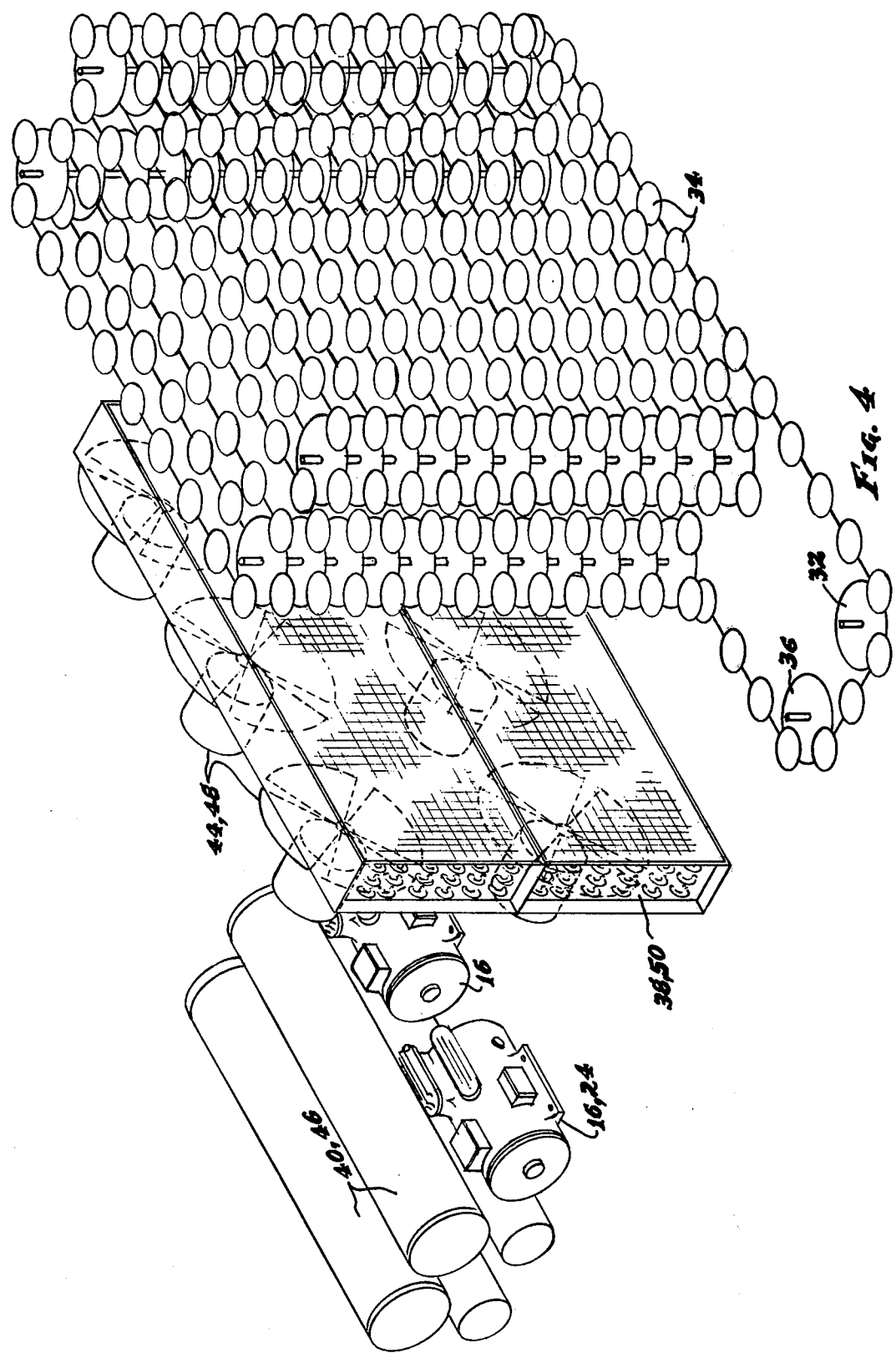

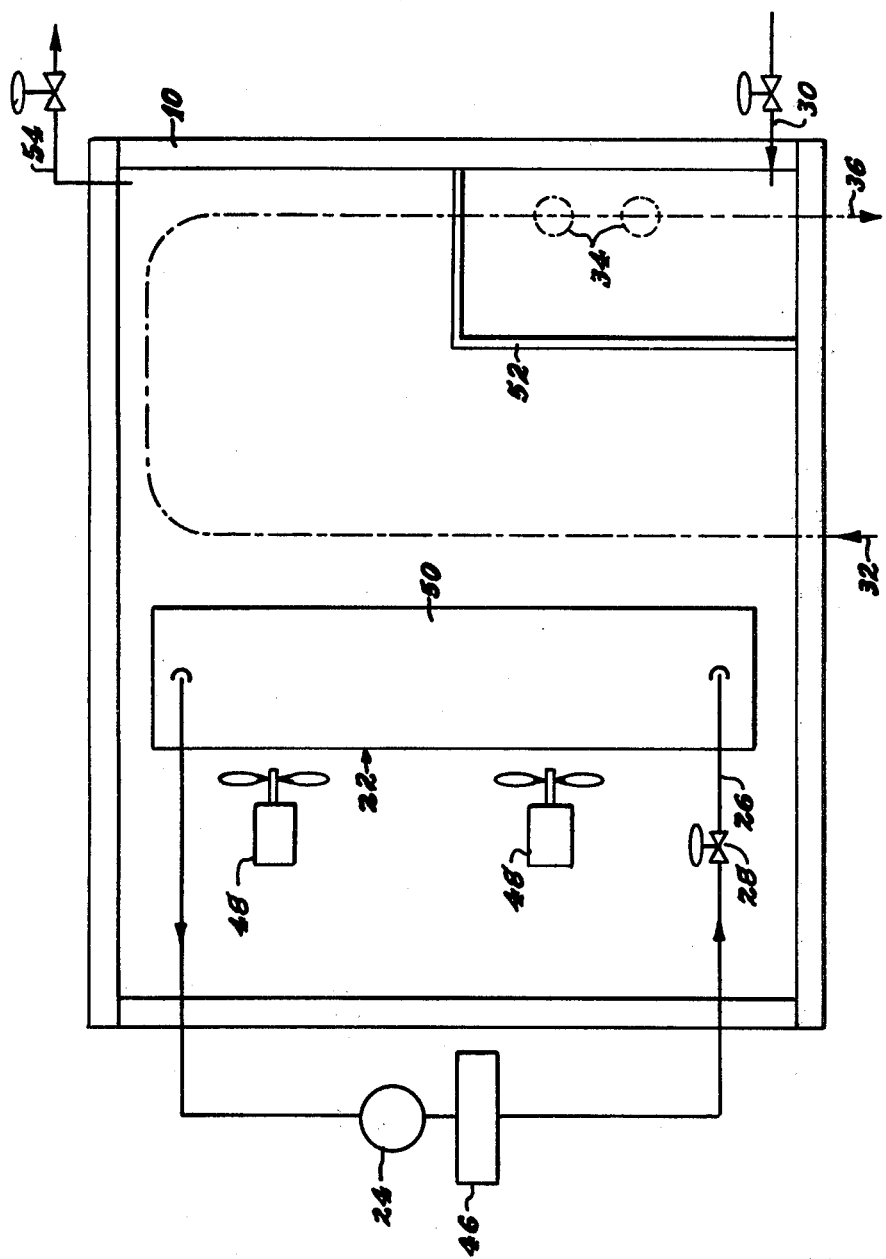

FREEZING APPARATUS AND METHOD

This invention relates to an apparatus and process for the freezing of food products.

Concepts of the present invention provide that inert gases are utilized to provide a controlled atmosphere in the freezing compartment or chamber through which the foodstuff items are passed. The supply of inert gas may be desirably wholly carbon dioxide or at least substantially carbon dioxide; and by the provision of an atmosphere of such gas it has been found that several advantages and benefits occur.

More particularly, benefits from such an atmosphere include a regulation or control of vapor pressure, dry bulb, wet bulb, and chemical composition, and dew point and mechanical refrigeration coil, thereby avoiding or minimizing getting moisture on the foodstuff items, and snow at the entrance and at the discharge of the conveyor entrance and outlet. This inert gas atmosphere also provides a regulation or control of the color of the frozen foodstuff by the control of such factors as the water vapor and oxygen which otherwise would or might cause certain colorations of certain foodstuffs, and which would or might cause undesirable frosting or other effects such as sogginess when the foodstuff is subsequently unfrozen by the consumer. The comparative higher vapor pressure of carbon dioxide greatly reduces yield loss, by preventing evaporation from the foodstuffs.

The controlled atmosphere also controls other factors such as bacteria, texture, and other factors some of which depend upon the nature of the foodstuff.

Thus, the concepts provide advantages of foodstuff-freezing apparatus and process in a very important and essential food-processing procedures in a vitally significant industry, achieving economically and advantageously a high quality and high volume of foodstuff-freezing.

In the embodiments herein set forth, illustrative of the inventive concepts for the mass-production freezing of individual pies, there are but two stages of refrigeration shown illustratively, illustrating the inventive concepts; although more may advantageously be provided and utilized, each adding sequentially to the overall temperature-lowering effect.

Depending upon whether a separate post-baking cooler is employed, the overall temperature ranges herein involved would be generally from something like 75° F. up to the post-baking or cooking temperature of about 175° F., down to approximately a minus 10° F.

The above description is of introductory and somewhat generalized form. More particular details, features, and concepts of an illustrative embodiment are set forth in the more detailed description thereof which follows, taken in conjunction with the accompanying drawings, which are generally of schematic or diagrammatic nature, and in which:

FIG. 2 is another overall pictorial view of the embodiment generally as shown in FIG. 1, in smaller scale;

FIG. 3 is an overall pictorial view of the exterior casing, doors and most other exteriorly-visible details omitted;

Figure 1:
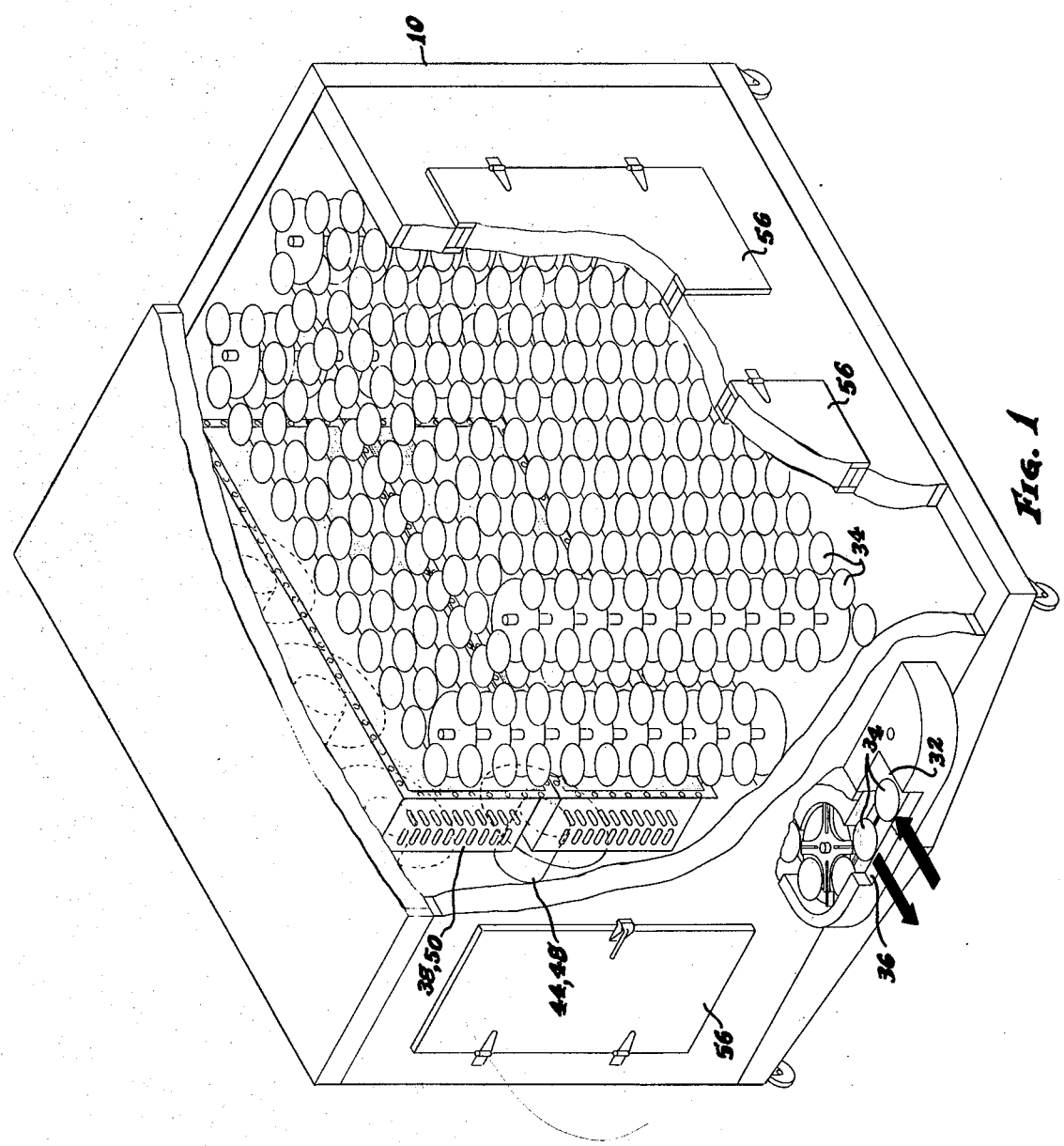
FIG. 1 is an overall pictorial view of an embodiment illustrative of the inventive concepts, portions broken away to illustrate interior details.
Figure 5:
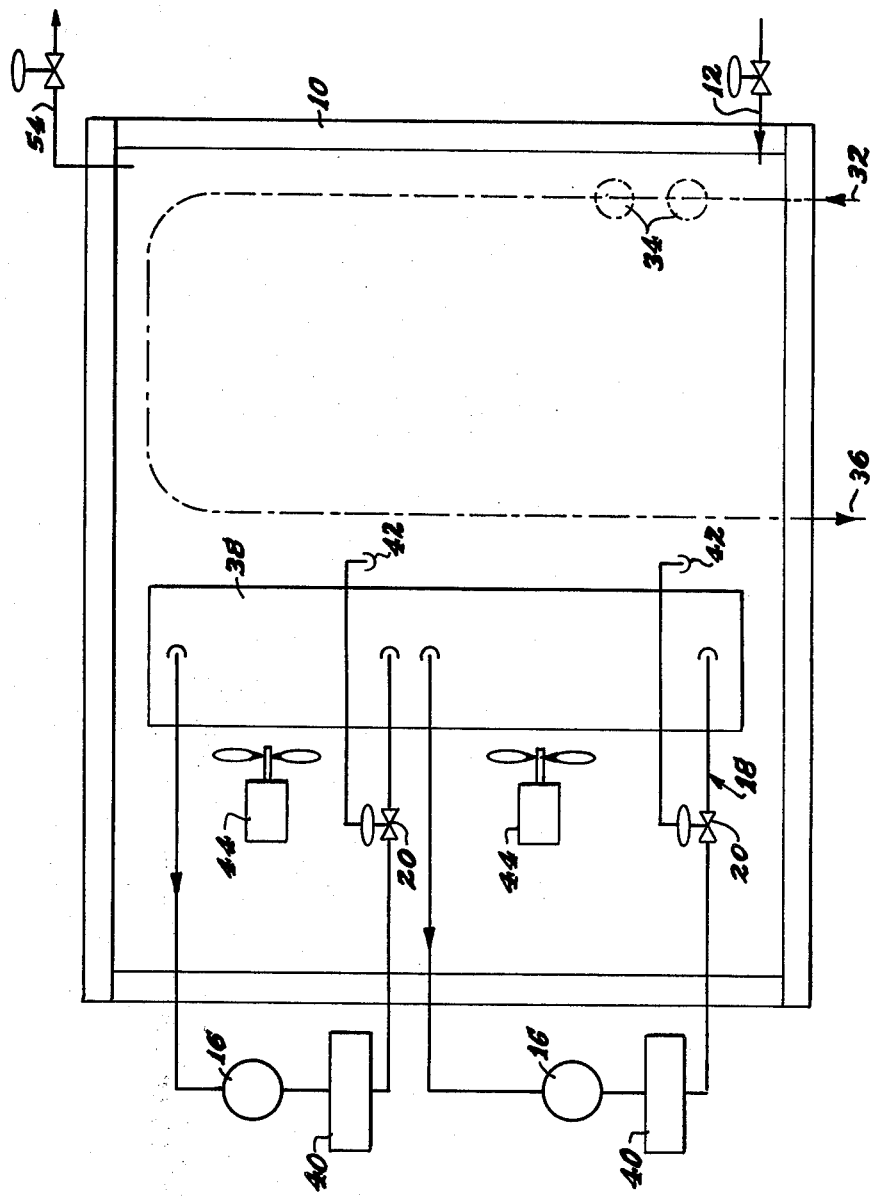

FIG. 4 is a schematic interior view of the embodiments shown in the preceding Figures; and FIG. 5 is a schematic view of an apparatus and process of a first embodiment illustrative of the inventive concepts, in which all of the temperature lowering is by a refrigerant fluid system utilizing compression and expansion of the refrigerant fluid as the refrigerant procedure throughout the entirety of the entire temperature range and with carbon dioxide means for providing a controlled atmosphere.

As shown in the drawings, the apparatus and process are illustrative of the present inventive concepts for the cooling of unfrozen foodstuff to a desired low temperature below its freezing point, wherein, in the overall housing means 10, in which the foodstuff cooling is achieved, there are provided means providing a controlled atmosphere in said housing; and this controlled atmosphere (which controls or regulates vapor pressure, dew point, and foodstuff coloration incident to the cooling process) includes means supplying carbon dioxide inert gas into the housing 10.

In the illustrated embodiment (FIG. 5), a controlled atmosphere in the housing 10 is achieved by carbon dioxide inert gas supplied through conduit 12, in which the entire lowering of temperature of the foodstuff, from its unfrozen state down through its freezing point and sub-freezing desired low temperature, is by refrigerating means 14 including a refrigerant fluid system including in the form shown a 2-stage refrigeration in which each stage includes a compression means 16 and an expansion means 18 (with an expansion valve 20) by which heat from within the housing 10 is removed by the expansion of refrigerant fluid. (This is often referred to as a "mechanical" refrigeration, even though that term is not strictly accurate or functionally descriptive of this type of refrigeration.)

The foodstuff typically or desirably frozen by the apparatus and process of the illustrative embodiment are pies; and these are shown as entering the housing 10 through an appropriate inlet opening 32, and traveling on chain-connected carriers 34 which as shown move in a sort of serpentine manner within the housing 10, ultimately to an appropriate housing outlet 36.

In such travel, in both embodiment the pie-carriers 34 travel in a manner such that the outlet 36 (which is adjacent the pies which are coldest) is adjacent the coldest part of the refrigerant system. For example, in FIG. 5 the foodstuff outlet 36 is shown adjacent the refrigeration coil 38 of the second (or coldest) stage of the refrigeration.

More particularly, in the embodiment of FIG. 5, each stage of the "mechanical" refrigeration system is shown as including (in addition to the components already mentioned) a condenser 40, a temperature-responsive control device 42 for controlling or regulating the expansion valve 20, and a fan means 44 which blows the gas interior of the housing 10 past the refrigerant coil 38 and into confrontation with the array of foodstuff carriers 34.

The embodiment is shown as including a housing vent 54, and with one or more access doors 56.

The refrigeration means as shown is such that the so-called "mechanical refrigeration" is utilized to draw the temperature to the desired temperature below the freezing point, that is, removal of heat of the foodstuff down through the sensible (both above and below freezing) heat range and removal of the latent heat of fusion; this is in contrast to prior art such as that of U.S. Pat. No. 3,507,128, issued Apr. 21, 1970, to T. H. Murphy et al., which uses cryogenic refrigeration in the temperature region of the freezing point to remove the latent heat of fusion.

The inert gas carbon dioxide is a gas, which has the characteristics of an oxygen free chemical composition and it is substantially denser than air, and has a low wet bulb temperature and in this application a desired high dry bulb temperature. If the inert gas is being supplied by means of a high pressure container, it is necessary to heat the inert gas to a temperture higher than the wet bulb temperature of the outside ambient air. Any convenient heating means may be employed such as a finned heat exchanger of some sort. However, if the inert gas is being supplied by some low-pressure source such as an inert gas generator whose discharge has a pressure of about 10 inches of water, no auxiliary heater need be used, for the additional reasons that its high dry bulb temperature is always higher than the wet bulb temperature of the ambient air.

The carbon dioxide heaviness (in comparison to ambient air) provides that the air locks 32–36 for foodstuff entrance and exit may be eliminated by positioning those stations at the high level of the installation rather than the low level shown in the drawings; for where the only housing openings are that high, the heavy carbon dioxide will completely cover the foodstuffs and refrigerant coils due to gravity. If an air lock such as 32–36 is desired, there is desirably provided an auxiliary source of carbon dioxide for introduction thereof immediately adjacent the air lock. Whichever method is used in that respect, means are provided to continue to supply whatever additional gas is necessary to maintain sufficient gas pressure inside the enclosure in comparison to the ambient air pressure outside the enclosure so that leakage at the entrance and exit of the enclosure does not admit any significant amount of either air or water vapor into the enclosure.

It is thus seen that a foodstuff freezing apparatus and process provides novel and advantageous concepts and features of construction and operativity.

Accordingly, it will thus be seen from the foregoing description of the invention according to this illustrative embodiment, considered with the accompanying drawings, that the present invention provides a new and useful freezing apparatus and process for the freezing of foodstuff items, the apparatus and process having desired advantages and characteristics, and accomplishing its intended objects, including those hereinabove pointed out and others which are inherent in the invention.

Modifications and variations may be effected without departing from the scope of the novel concepts of the invention; accordingly, the invention is not limited to the specific form or arrangement of parts herein shown or described.

What is claimed is:

1. A method or process for cooling unfrozen foodstuff to a desired low temperature below the freezing point thereof, in an enclosure having a foodstuff entrance and a foodstuff exit, comprising the steps of:
    supplying a gas consisting substantially of carbon dioxide into the said enclosure in an amount sufficient to at least substantially purge the air and water vapor therefrom,
    and continuing to supply whatever additional gas is necessary to maintain sufficient gas pressure inside said enclosure in comparison to the air pressure outside the enclosure so that leakage at the entrance and exit of the enclosure does not admit any significant amount of either air or water vapor into said enclosure,
    in which the entire lowering of temperature of the foodstuff, from its unfrozen state and down through its freezing point and clear down to its said sub-freezing desired low temperature thereof, is by refrigerating means including a refrigerant fluid system including compression means and expansion means by which heat from said foodstuff is removed by the expansion of refrigerant fluid,
    in a combination in which the coldest region of said refrigerant fluid system is operatively adjacent the portion of foodstuff which is at its lowest temperature.

2. A method or process for cooling unfrozen foodstuff to a desired low temperature below the freezing point thereof, in an enclosure having a foodstuff entrance and a foodstuff exit, comprising the steps of:
    supplying a gas consisting substantially of carbon dioxide into the said enclosure in an amount sufficient to at least substantially purge the air and water vapor therefrom,
    and continuing to supply whatever additional gas is necessary to maintain sufficient gas pressure inside said enclosure in comparison to the air pressure outside the enclosure so that leakage at the entrance and exit of the enclosure does not admit any significant amount of either air or water vapor into said enclosure,
    in a combination in which the foodstuff entrance and exit are positioned at the high level of the installation whereby the heavy carbon dioxide will completely cover the foodstuffs and refrigerant coils due to gravity, and rendering it of no bothersome effect if ambient air leaks into the enclosure at such a high elevation.

* * * * *

UNITED STATES PATENT OFFICE
CERTIFICATE OF CORRECTION

Patent No. 4,138,854            Dated February 13, 1979

Inventor(s) Alfred H. Schlemmer

It is certified that error appears in the above-identified patent and that said Letters Patent are hereby corrected as shown below:

In the Abstract, the last line: After the word "temperature" insert a period (.) and cancel the remainder of the line.

Col. 1, lines 15 and 16: The phrase "and dew point" should be cancelled.

In the Drawings, Fig. 6 should be cancelled.

Col. 2, line 42: The phrase "in both embodiment" should be cancelled.

On the title page, below the Abstract, "6 Drawing Figures" should read -- 5 Drawing Figures --.

Signed and Sealed this

Eleventh Day of November 1980

[SEAL]

Attest:

SIDNEY A. DIAMOND

Attesting Officer     Commissioner of Patents and Trademarks